United States Patent [19]

Bontrager

[11] 4,363,583
[45] Dec. 14, 1982

[54] HAY BALE LOADER

[76] Inventor: Jacob Bontrager, Highway 281 North, Jamestown, N. Dak. 58401

[21] Appl. No.: 205,669

[22] Filed: Nov. 10, 1980

[51] Int. Cl.³ .............................................. A01D 87/12
[52] U.S. Cl. ................................... 414/24.5; 414/44; 414/501; 414/547; 414/555
[58] Field of Search .................. 414/24.5, 24.6, 518, 414/547, 551, 552, 555, 733, 734, 739, 58, 44, 501; 294/107

[56] References Cited

U.S. PATENT DOCUMENTS

| | | | |
|---|---|---|---|
| 3,170,580 | 2/1965 | Soyko | 414/718 X |
| 3,468,439 | 9/1969 | Olitsky et al. | 414/547 X |
| 3,800,966 | 4/1974 | Newton | 414/555 X |
| 3,942,666 | 3/1976 | Pfremmer | 414/24.5 X |
| 3,952,881 | 4/1976 | Knudson | 414/58 |
| 4,015,726 | 4/1977 | Baker | 414/555 |
| 4,091,943 | 5/1978 | Bay-Schmith | 414/555 X |

FOREIGN PATENT DOCUMENTS 920918   3/1963   United Kingdom ................ 414/734

Primary Examiner—Leslie J. Paperner
Attorney, Agent, or Firm—Marmaduke A. Hobbs

[57] ABSTRACT

A hay bale loader which may be attached to a hay stack mover or other hauling equipment for grasping and lifting big bales of hay, and for placing them on the hauling equipment. A boom which is attached to a frame and is movable between vertical and angular lateral positions, includes male and female portions slidably disposed relative to each other. An arm extends rearwardly from the boom, and a bale holding mechanism including pairs of opposing tines is suspended therefrom over the top of the hauling equipment. When the boom is lowered toward the ground, the tines of the bale holding mechanism are opened to surround the hay bale and then the tines are closed to grasp the bale. The boom is raised and adjusted to position the bale on the hauling equipment, after which the bale is released by opening the tines. The loader can also be used to individually unload the bales from the hauling equipment and to unload loose hay in small quantities for feeding.

8 Claims, 4 Drawing Figures

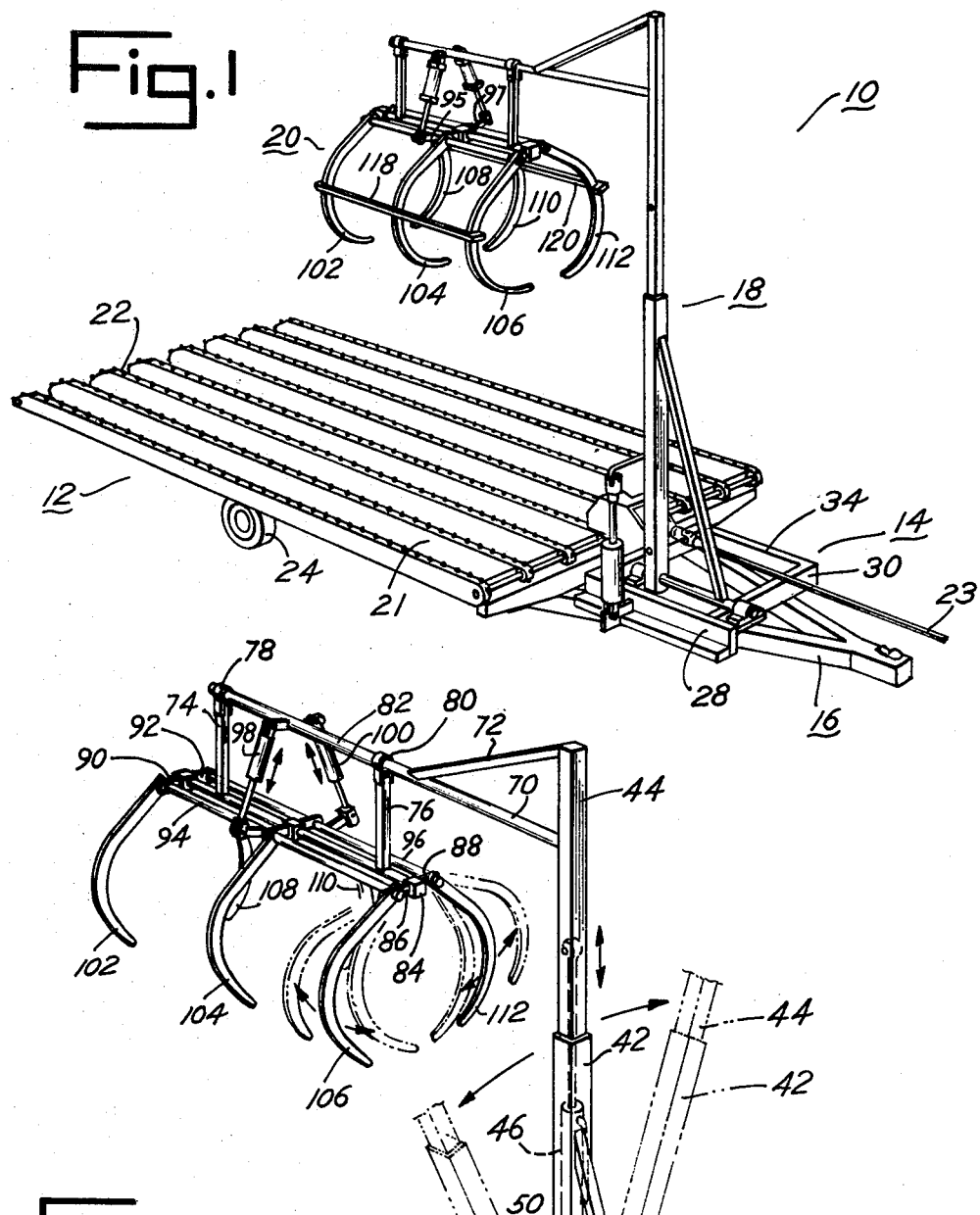

HAY BALE LOADER

BACKGROUND OF THE INVENTION

The handling and processing of hay by farmers have undergone a steady development since mobile powered farm equipment has become available. For a long period of time hay was handled in a loose form. The cut and dried hay was loaded by hand with forks or by hay loading machines onto wagons pulled by tractors or horses, and was stored in loose form in barns or in stacks outside. Handling of the loose hay was inconvenient during harvesting, storing and feeding, and to facilitate hay handling, hay balers were developed which took a quantity of loose hay, compressed the hay, and bound the compressed bundles of hay with wire or twine strands. Many of the early balers were stationary, and the loose hay was gathered in the fields, brought to the balers and formed into bales. Soon mobile balers were developed, and the cut, dried and windrowed hay could be picked up in the field by the baler, compressed into bundles and secured. As a bale was discharged from the chute of a mobile baler it either was allowed to drop in the field for later retrieval or was loaded directly by a farm laborer onto a wagon pulled behind the mobile baler. More recently, bale throwers have been developed which forcibly eject the bale from the baler chute into large racks or bins on a wagon drawn behind the baler. All of the balers developed in the early and intermediate stages of baling equipment development were designed to form bales which could be handled by a single worker. Thus, the bales were of a size and weight which could be lifted by the worker, carried by the worker, stacked in the barn, and later fed to animals by one worker.

It has become apparent that it is more economical to handle hay mechanically in large bales than to handle it manually in smaller bales. The economic advantage is particularly significant in large scale cattle operations wherein hundreds or thousands of animals are fed each day, such as in beef cattle feed lots or large dairy herd operations utilizing loafing barns and the like. When hundreds or thousands of animals are to be fed, an extremely large number of the smaller bales, which normally weigh about 50 to 100 pounds, are required, and significant amounts of time are needed for the feeding operations in these circumstances. To increase the efficiency of the hay feeding process, machines for mechanically handling the bales have been developed, such as for example hay stack movers which can pick up, transport and unload a large quantity of small bales simultaneously. Since the development has been toward increased mechanical handling of hay bales, it is no longer necessary to form the bales in a size and weight which a farm worker can handle manually. Hence, hay balers which make much larger bales than those made by previous balers have been developed and are becoming more commonly used. The new balers form loaf-like bales or, more commonly, cylindrically shaped bales, often referred to as "big bales" or "giant bales" weighing hundreds of pounds. One of the advantages of such bales, besides the advantage that, with the proper equipment, a single worker can handle much more hay per hour than with man size bales, is that the giant bales, which have rounded tops as opposed to the flat tops of earlier bales, shed rainwater and snow in the field and can be left out of doors, yet will experience only a minimal amount of spoilage. Thus, stacking of hay in barns is no longer necessary.

With the recent development of the big bale balers, the development of appropriate bale handling equipment for the much larger bales has somewhat lagged behind the development of the balers themselves. Typically, the big bales are handled with equipment not specifically built for that purpose; thus efficiency is lost. Hence, the big bales are normally dropped in the field and later retrieved by a worker using a tractor with front end loader with which he lifts the bales from the field and places them on trucks or wagons to be hauled to the feeding areas. Two workers are required, one to operate the lifting equipment and one to operate the hauling equipment. The bales are often unloaded from the truck or wagon and restacked in a more convenient location for later use. This requires lifting of the bales twice, first to load them on to the transport equipment and secondly to unload them and stack them in the desired place. Some farmers have uses for both big and small bales; therefore, it is desirable to provide equipment for adapting existing small bale equipment, such as hay stack movers, to big bale handling, thereby minimizing equipment investments. It is also desirable to provide a big bale handling system which requires only one worker to operate, thereby freeing other workers to perform other tasks.

SUMMARY OF THE INVENTION

With the wide availability of hay stack movers and the increased desirability of big bale handling equipment, it is one of the principal objects of the present invention to provide a loader which can be used to lift and stack giant or big bales onto hauling equipment, and which more specifically can be used with hay stack movers to provide efficient handling of the big bales in the fields so that the big bales in a stacked position can be unloaded in the holding area.

The above mentioned and other objects are accomplished with the present invention by providing a clam-like structure on a vertically adjustable boom which can be mounted on the front of a hay stack mover to lift the big bales and stack the big bales on the hay stack mover. Two layers of bales are formed on the hay stack mover, the bottom layer having two or more bales across, and the top row being one or two bales disposed on top of and between the lower layer bales. The boom of the loader is pivotal about a horizontal axis in addition to being vertically adjustable, hence permitting the clam to be lowered to the ground for gripping the bale to be lifted. When mounted on the frame of a haystack mover, the present big bale loader can be operated from the same tractor pulling the stack mover, thus requiring only one worker for loading and hauling the bales.

Another object of the present invention is to provide a bale loader for big bales which can be used to unload individual bales or loose hay in small quantities for feeding, and which will pick up big bales in virtually any position, whether the bale is lengthwise or endwise with respect to the loader.

A further object of the present invention is to provide a bale loader for big bales which is relatively simple in design having only a minimal number of moving parts, thereby requiring only minimal maintenance and being economically priced, and which can be used efficiently while connected to hauling equipment, thereby enabling one worker to operate both the loading and hauling equipment with one farm tractor, hence reducing bale handling expenses in man hours and energy costs.

Additional objects and advantages of the present invention will become apparent from the following detailed description and the accompanying drawings.

BRIEF DESCRIPTION OF THE DRAWINGS

FIG. 1 is a perspective view of a hay bale loader embodying the present invention, attached to a hay stack mover;

FIG. 2 is a perspective view of the hay bale loader, with various operating positions and some concealed parts shown by broken lines;

DESCRIPTION OF PREFERRED EMBODIMENT

Figure 3:
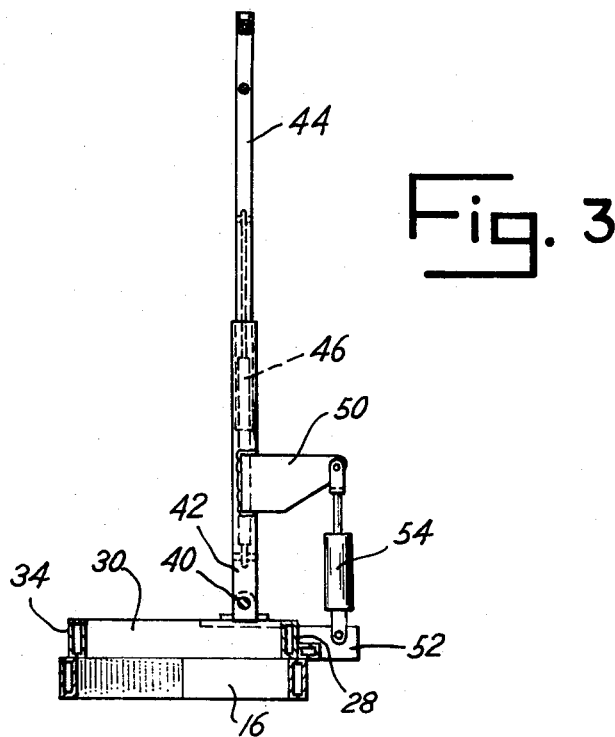
FIG. 3 is a cross sectional view of the hay bale loader shown in FIG. 2, taken on line 3—3 of the latter figure.

Referring more specifically to the drawings, and to FIG. 1 in particular, numeral 10 designates a hay bale loader embodying the present invention, which is shown mounted on a hay stack mover 12. Although loader 10 is shown in combination with a hay stack mover, a hay bale loader embodying the present invention may also be used advantageously with other types of hauling equipment, such as conventional hay wagons, trucks or the like, either attached to the hauling equipment or operated independently therefrom. The hay stack mover shown in FIG. 1 has been included as an example of one suitable type of hauling equipment which can be used advantageously with the present hay bale loader.

Hay bale loader 10 includes a base 14 which, in the embodiment shown, is adapted to be mounted on frame 16 of hay stack mover 12. A telescopically adjustable boom 18 extends upwardly from base 14 and is pivotal with respect thereto about a horizontal axis. A bale grasping mechanism 20 is attached to the boom for grasping a bale, lifting it from the ground, and placing the bale on bed 21 of hay stack mover 12. One of the principal advantages of the hay stack mover over other types of hauling equipment is that the hay bales can be loaded on the front of the hay stack mover, and moved to the rear of the stack mover by chains 22 operated by a power take-off shaft 23 connected to the power take-off drive of a tractor. The hay stack mover also is advantageous in that it is specifically designed for moving large amounts of hay on its wheels 24 and 26, and it is specifically adapted for unloading hay from the hay stack mover, at the rear portion thereof, without substantially disturbing the pile of hay.

Base 14 of hay bale loader 10 includes frame members 28, 30, 32 and 34 which are attached to frame 16 of hay stack mover 12. The frame members forming the base of loader 10 may be made in virtually any shape necessary for mounting on the frames of various haystack movers or other types of equipment such as hay wagons, and U-bolts or the like may be used to fasten the frame to the hauling equipment. In some applications, the loader may have its own independent transport mechanism apart from the hauling equipment; however, such an arrangement is generally less desirable. Pillow blocks 36 and 38 are disposed on frame members 30 and 32, respectively, and a shaft 40 is rotatably disposed in the pillow blocks. Boom 18 includes a female member 42, through which shaft 40 is disposed and to which the shaft is securely fastened, and a male member 44 which may be moved into and out of the female member for adjusting the overall length of the boom. A hydraulic cylinder 46 is disposed in the boom, with one end of the cylinder being attached to female member 42 and the other end of the cylinder being attached to male member 44. Thus, telescopic adjustment of the boom is performed by operating hydraulic cylinder 46. A reinforcing bar 48 is disposed between female member 42 and shaft 40 to provide additional stability to boom 18. Attachment plates 50 and 52 are disposed on female member 42 and frame member 28, respectively, and a hydraulic cylinder 54 is attached between plates 50 and 52. Operation of hydraulic cylinder 54 moves boom 18 from a vertical position to positions either to the right or left of vertical, as indicated by the broken lines in FIGS. 2 and 4. As cylinder 54 operates, shaft 40 rotates in pillow blocks 36 and 38, and boom 18 and reinforcing bar 48, being rigidly connected to the shaft, are moved through the angle of operation. The movements of cylinders 46 and 54 are indicated by the arrows in FIGS. 2 and 4, and alternative positions for boom 18 are indicated by the broken lines in the drawings.

An arm 70 is attached to male member 44 near the free or upper end of the male member and extends rearwardly over the front portion of the bed of haystack mover 12. A reinforcement bar 72 is disposed between arm 70 and male member 44, and bars 74 and 76 are suspended from arm 70 by collars 78 and 80 which are attached to the bars and are rotatably disposed on the arm. Hence, bars 74 and 76 may pivot with respect to arm 70. A sleeve 82 is disposed around arm 70 between collars 78 and 80, and a cross bar 84 is disposed at the end of suspended bars 74 and 76. Plates 86 and 88 extend outwardly from opposite sides of cross bar 84 near one end thereof, and plates 90 and 92 are similarly disposed near the other end of cross bar 84. A shaft 94 having a radially extending arm 95 is rotatably connected to plates 86 and 90, and a shaft 96 having a radially extending arm 97 is rotatably connected to plates 88 and 92. A hydraulic cylinder 98 is disposed between sleeve 82 and arm 95 and a hydraulic cylinder 100 is disposed between sleeve 82 and arm 97. Extension or retraction of the rods from cylinders 98 and 100 rotates shafts 94 and 96, respectively. Arcuate shaped tines 102, 104 and 106 are attached to shaft 94, and a similar set of arcuate shaped tines 108, 110 and 112 is attached to shaft 96. The free ends of the tines on each side of cross bar 84 oppose the end of one of the tines on the opposite side. Hence, extension of the rods of cylinders 98 and 100 brings the ends of tines 106 and 112 in close proximity, as well as the ends of tines 104 and 110, and tines 102 and 108. Retraction of the rods into the cylinders increases the distance between the opposing tine pairs. Thus, the tines operate as a giant clam or claw in grasping and releasing bales. Reinforcing members 118 and 120 can be used between the tines on either side of cross bar 84 to reinforce the tines and restrict the deflection thereof during operation.

Figure 4:
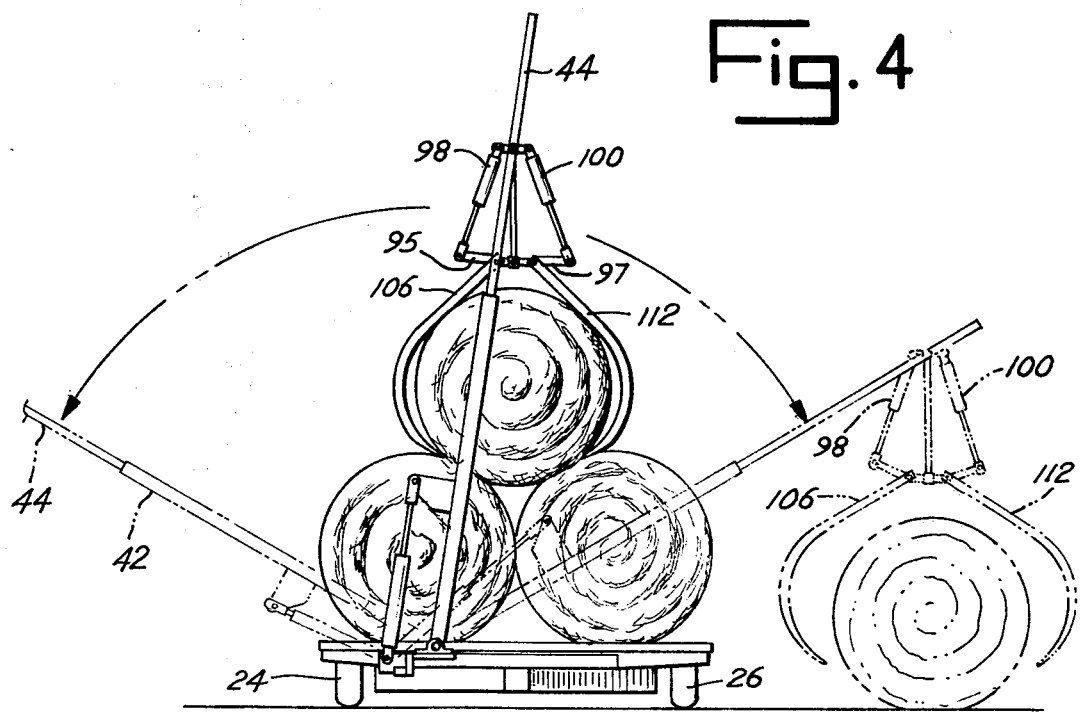
FIG. 4 is an end view of the hay bale loader, showing the procedure for grasping, lifting and loading the hay bales.

In the use and operation of a hay bale loader embodying the present invention, the loader is attached to the frame of hay stack mover 12, or to other suitable hauling equipment, by U-bolts which secure frame members of the loader and mover together, or by other suitable attachment means. It may be desirable in some instances to permanently attach the hay bale loader to the hay stack mover by welding or the like; however, if the hay stack mover will also be used in the conventional manner to move small bales, it may be desirable to remove loader 10 therefrom, and a non-permanent attachment would be preferred. Hydraulic lines for the hydraulic cylinders in the present invention, though not shown in the drawings, are generally disposed in or along the structural members of the loader, such as for example frame members 28, 30, 32 and 34. Thus, when the stack mover and bale loader combination is to be used to gather bales from the hayfield, a tractor is attached to the hitch of the stack mover, the hydraulic lines for cylinders 46, 54, 98 and 100 are connected to the hydraulic system of the tractor and power shaft 23 of mover 12 is coupled to the tractor power take-off. The stack mover with bale loader thereon is pulled to the field or other location of hay bales and is pulled alongside a hay bale. Depending upon which side of the loader the bale is on, the rod of cylinder 54 is either extended or retracted to lower boom 18 toward the ground. For example, movement to the right of vertical as shown in FIG. 4 requires an extension of the rod of cylinder 54, while movement to the left requires retraction of the cylinder rod. Since the loader operates to either side of the haystack mover, the loader can be pulled through the field between two rows of bales and bales from both rows can be loaded. As boom 18 is lowered toward the ground, the bale grasping mechanism, including the opposed pairs of tines suspended from arm 70, will remain in a substantially vertical position. Sleeve 82 and collars 78 and 80 with the mechanisms suspended therefrom are rotatably disposed on arm 70, and the weight of the suspended mechanisms causes the collars and sleeve to pivot on the arm and remain vertically suspended as the boom is moved. Cylinders 98 and 100 are normally operated simultaneously to separate the tines, thus permitting them to surround a hay bale. Cylinder 46 can be used to adjust the length of male member 44 projecting outwardly from female member 42. Thus, the loader need not be driven with extreme accuracy to within a particular distance of the hay bale, so long as it is close enough to be within the operating distance of cylinders 46 and 54. The combined effect of the adjustments performed by cylinders 46 and 54 provides a relatively long operating area in which bales may be grasped.

As boom 18 is lowered toward the ground, the tines of grasping mechanism 20 are opened, and lowering of boom 18 continues until the tines sufficiently surround the bale to grasp it when the opposing tines are brought together. This position is shown in FIG. 4. When the tines are closed, the ends thereof will be embedded in the hay bale. Boom 18 is raised toward its vertical position, thereby lifting the hay bale from the ground. Since the bale grasping mechanism is disposed over the front portion of the hay stack mover, as the bale is raised it is swung over the side of the hay stack mover. Normally, two bales will fit side-by-side across the width of the hay stack mover, as shown in FIG. 4. Adjustment of hydraulic cylinders 54 and 46 permits positioning of the bale on the hay stack mover in the desired location, regardless of the side from which the bale was lifted. After two bales have been placed on the bed of the hay stack mover, an additional bale can be placed on top of the first two and, when released, it will nestle between the two bales as illustrated in FIG. 4. After the bale is placed in the desired location, the tines of the grasping mechanism are opened to release the bale. At all times during movement of the bale, the bale and grasping mechanism 20 will be vertically suspended from arm 70 due to the pivotal attachment between the grasping mechanism and the arm. After one set of three bales has been placed on the hay stack mover, the bales so placed can be moved rearwardly on the stack mover by operating chains 22, and an additional set of three bales can then be placed in front of the first set of bales. This procedure can be continued until the hay stack mover is completely filled.

The loaded bales are hauled to an appropriate site for storage, or can be left on the hay stack mover until they are to be used. The hay stack mover can be unloaded by chain 22, which will move the bales off the end of the hay stack mover as the mover is tilted and pulled forward, or the bales can be unloaded individually and placed where desired by grasping them between the tine pairs and lowering them to the ground in operation the reverse of that described for loading hay bales. A particular advantage of the present hay bale loader is that the tines of grasping mechanism 20 will pick up bales regardless of the position of the bale on the ground with respect to the loader. Hence, the hay stack mover need not be pulled precisely parallel with the hay bales, as the tines will adjust the position of the bales when they are closed. Also, if a bale is standing on end, it can still be grasped by the hay bale loader, lifted slightly and dropped to lay it in proper position for loading. The tines of the loader embed themselves sufficiently to grasp loosely formed bales with little or no destruction to the bale.

Although one embodiment of a hay bale loader has been described in detail herein, various changes may be made without departing from the scope of the present invention.

I claim:

1. A hay bale loader for use with bale hauling equipment having a rear unloading capability, comprising frame members forming a base for the loader, a boom extending upwardly from said base and having a lower and an upper section telescopically arranged relative to one another, a pivot means positioned longitudinally relative to the hauling equipment for said boom, an arm extending longitudinally outwardly from said boom over the bale hauling equipment and being fully supported by said boom, bale grasping means disposed on said arm and having laterally movable opposed members for grasping a hay bale, a power operated means for moving said upper boom section telescopically relative to said lower boom section, power operated means moving said opposed members toward and away from one another, power operated means for moving said boom on said pivot means to either side of said equipment for bringing said grasping means in proximity to the bale to be loaded, for raising the bale grasped by said grasping means, and for moving the bale suspended from said grasping means to said bale hauling equipment.

2. A hay bale loader as defined in claim 1 in which said boom is pivotally connected to said frame and is movable between vertical position and angular positions to either side of the vertical.

3. A hay bale loader as defined in claim 1 in which said opposed members include first and second sets of tines, each being secured on one end along rotatable co-planar axes and being of arcuate shape for bringing the free ends of each set of tines in opposing relationship to each other.

4. A hay bale loader as defined in claim 3 in which said arm extends rearwardly from said upper section, and support means are pivotally connected to said arm for suspending said grasping means for free swinging lateral, angular movement beneath said arm.

5. A hay bale loader as defined in claim 4 in which said last mentioned power operated means is a hydraulic cylinder disposed between said base and said lower section to move said boom between vertical and lateral angular positions.

6. A hay bale loader as defined in claim 5 in which said first mentioned power operated means is a hydraulic cylinder disposed in said boom and is attached at one end to said upper section and at the other end to said lower section to telescopically move said sections.

7. A hay bale loader as defined in claim 6 in which hydraulic cylinders are disposed between said arm and each of said co-planar axes of said tines for opening and closing said tines.

8. A hay bale loader as defined in claim 7 in which said frame members are adapted for being mounted on the frame of a hay stack mover.

* * * * *